US009634601B2

(12) United States Patent
Kessler et al.

(10) Patent No.: US 9,634,601 B2
(45) Date of Patent: *Apr. 25, 2017

(54) ENERGY STORAGE DEVICE, SYSTEM COMPRISING AN ENERGY STORAGE DEVICE, AND METHOD FOR ACTUATING AN ENERGY STORAGE DEVICE

(71) Applicant: Robert Bosch GmbH, Stuttgart (DE)

(72) Inventors: Martin Kessler, Schwaebisch Gmuend (DE); Erik Weissenborn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

This patent is subject to a terminal disclaimer.

(21) Appl. No.: 14/367,272

(22) PCT Filed: Dec. 3, 2012

(86) PCT No.: PCT/EP2012/074232
§ 371 (c)(1),
(2) Date: Jun. 20, 2014

(87) PCT Pub. No.: WO2013/092183
PCT Pub. Date: Jun. 27, 2013

(65) Prior Publication Data
US 2015/0270801 A1    Sep. 24, 2015

(30) Foreign Application Priority Data

Dec. 22, 2011    (DE) .................. 10 2011 089 648

(51) Int. Cl.
*H02J 7/00*        (2006.01)
*H02P 25/16*       (2006.01)
(Continued)

(52) U.S. Cl.
CPC .......... *H02P 25/16* (2013.01); *B60L 11/1855* (2013.01); *B60L 11/1864* (2013.01);
(Continued)

(58) Field of Classification Search
CPC ... H02M 7/49; B60L 11/1855; B60L 11/1864; H02J 7/0014; H02J 7/0019; H02J 7/0024;
(Continued)

(56) References Cited

U.S. PATENT DOCUMENTS 5,642,275 A * 6/1997 Peng ................. H02M 7/49
                                                    363/137
5,670,861 A    9/1997 Nor
(Continued)

FOREIGN PATENT DOCUMENTS

CN    101039094 A    9/2007
DE    10103031      7/2002
(Continued)

OTHER PUBLICATIONS

International Search Report for Application No. PCT/EP2012/074232 dated Mar. 24, 2014 (English Translation, 2 pages).

*Primary Examiner* — Vuthe Siek
(74) *Attorney, Agent, or Firm* — Michael Best & Friedrich LLP

(57) ABSTRACT

The invention relates to an energy storage device for generating an n-phase supply voltage, wherein n>1, comprising n energy supply branches connected in parallel, which are each coupled to a respective output connection of the energy storage device, wherein each of the energy supply branches has a plurality of energy storage modules connected in series. The energy supply branches each have a respective energy storage cell module, which has at least one energy storage cell, and a respective coupling device having first coupling elements, which are designed to selectively con- (Continued)

nect the energy storage cell module into the respective energy supply branch or bypass the energy storage cell module. At least one of the energy supply branches has at least one second coupling element, which is coupled between output connections of energy storage cell modules that are adjacent in the at least one energy supply branch and which is designed to connect the coupled energy storage cell modules into the respective energy supply branch in parallel with each other.

17 Claims, 2 Drawing Sheets

(51) Int. Cl.
  *H02M 7/49* (2007.01)
  *B60L 11/18* (2006.01)
  *H02P 4/00* (2006.01)

(52) U.S. Cl.
  CPC .......... *H02J 7/0014* (2013.01); *H02J 7/0024* (2013.01); *H02M 7/49* (2013.01); *H02P 4/00* (2013.01); *H02J 7/0019* (2013.01); *Y02T 10/7005* (2013.01); *Y02T 10/7055* (2013.01); *Y02T 10/7061* (2013.01)

(58) Field of Classification Search
  CPC ........ H02P 25/16; H02P 4/00; Y02T 10/7005; Y02T 10/7055; Y02T 10/7061
  See application file for complete search history.

(56) References Cited

U.S. PATENT DOCUMENTS

| | | | | |
|---|---|---|---|---|
| 7,466,114 | B2* | 12/2008 | Derckx | H02M 3/073 323/225 |
| 2010/0066174 | A1* | 3/2010 | Dommaschk | H02M 1/32 307/75 |
| 2010/0127769 | A1* | 5/2010 | Bernhard | H02J 3/1857 327/581 |
| 2011/0215760 | A1 | 9/2011 | Van Lammeren | |
| 2012/0158073 | A1* | 6/2012 | Shao | A61N 1/3912 607/5 |
| 2013/0154379 | A1* | 6/2013 | Tiefenbach | B60L 11/1853 307/77 |

FOREIGN PATENT DOCUMENTS

| | | |
|---|---|---|
| DE | 102009034596 | 2/2011 |
| WO | 2011128153 A1 | 10/2011 |

* cited by examiner

ENERGY STORAGE DEVICE, SYSTEM COMPRISING AN ENERGY STORAGE DEVICE, AND METHOD FOR ACTUATING AN ENERGY STORAGE DEVICE

BACKGROUND OF THE INVENTION

The invention relates to an energy storage device, to a system comprising an energy storage device, and to a method for actuating an energy storage device, in particular in a battery direct inverter circuit for supplying current to electric machines.

The trend is that, in the future, electronic systems which combine new energy storage technologies with electric drive technology will be used increasingly both in stationary applications, such as wind turbines or solar systems, and in vehicles, such as hybrid or electric vehicles.

The feed of polyphase current to an electric machine is generally provided by an inverter in the form of a pulse-controlled inverter. For this purpose, a DC voltage provided by a DC link can be converted into a polyphase AC voltage, for example a three-phase AC voltage. The DC link is in this case fed from a string of battery modules connected in series. In order to be able to meet the requirements for power and energy provided for a respective application, often a plurality of battery modules are connected in series in a traction battery.

A series circuit comprising a plurality of battery modules is associated with the problem that the entire string fails when a single battery module fails. Such a failure of the energy supply string can result in failure of the entire system. Furthermore, temporarily or permanently occurring power reductions of a single battery module can result in power reductions in the entire energy supply string.

The document U.S. Pat. No. 5,642,275 A1 describes a battery system comprising an integrated inverter function. Systems of this type are known under the name multilevel cascaded inverter or else battery direct inverter (BDI). Such systems comprise DC sources in a plurality of energy storage module strings, which can be connected directly to an electric machine or an electric grid. In this case, single-phase or polyphase supply voltages can be generated. The energy storage module strings in this case have a plurality of energy storage modules connected in series, wherein each energy storage module has at least one battery cell and an associated controllable coupling unit, which makes it possible to interrupt the respective energy storage module string or to bypass the respectively associated at least one battery cell or to switch the respectively associated at least one battery cell into the respective energy storage module string, depending on control signals. By suitable actuation of the coupling units, for example with the aid of pulse width modulation, suitable phase signals can also be provided for controlling the phase output voltage, with the result that it is possible to dispense with a separate pulse-controlled inverter. The pulse-controlled inverter required for controlling the phase output voltage is therefore so to speak integrated in the BDI.

BDIs generally have an increased level of efficiency and a higher degree of failsafety in comparison with conventional systems. The failsafety is ensured, inter alia, by virtue of the fact that defective, failed or incompletely effective battery cells can be disconnected from the energy supply strings by suitable bypass actuation of the coupling units. The phase output voltage of an energy storage module string can be varied by corresponding actuation of the coupling units and in particular set stepwise. The stepwise setting of the output voltage in this case results from the voltage of a single energy storage module, wherein the maximum possible phase output voltage is determined by the sum of the voltages of all of the energy storage modules in an energy storage module string.

SUMMARY OF THE INVENTION

In accordance with one aspect, the present invention provides an energy storage device for generating an n-phase supply voltage, wherein $n \geq 1$, comprising n energy supply branches which are connected in parallel and which are each coupled to at least one output connection of the energy storage device, wherein each of the energy supply branches has a multiplicity of energy storage modules which are connected in series. In this case, the energy supply branches each comprise an energy storage cell module, which has at least one energy storage cell, and a coupling device comprising first coupling elements, which are designed to switch the energy storage cell module selectively into the respective energy supply branch or to bypass said energy storage cell module. In this case, at least one of the energy supply branches has at least one second coupling element, which is coupled in each case between output connections of adjacent energy storage cell modules in the at least one energy supply branch, and which is designed to switch the coupled energy storage cell modules in parallel with one another into the respective energy supply branch.

In accordance with a further aspect, the present invention provides a system, comprising n phase lines, which can be coupled to in each case one of n phase connections of an n-phase electric machine, an energy storage device according to the invention, whose output connections are coupled to in each case one of the n phase lines, and a control device, which is coupled to the energy storage device and which is designed to actuate the at least one second coupling element depending on a state of charge of the energy storage cells of the energy storage cell modules of the at least one energy supply branch for charge balancing between adjacent energy storage modules.

In accordance with a further aspect, the present invention provides a method for actuating an energy storage device according to the invention, comprising the following steps: actuating the first coupling elements of a first energy storage module of the at least one energy supply branch so as to switch the energy storage cell module of the first energy storage module into the energy supply branch, actuating the first coupling elements of a second energy storage module of the at least one energy supply branch so as to switch the energy storage cell module of a second energy storage module, which is adjacent to the first energy storage module, into the energy supply branch, closing a second coupling element, which is coupled between the first energy storage module and the second energy storage module, and actuating one of the first coupling elements of the first energy storage module in a pulse-width-modulated clocked operating mode depending on the states of charge of the energy storage cell modules of the first energy storage module and the second energy storage module.

The concept of the present invention consists in enabling improved charge balancing between individual energy storage modules of an energy storage device by virtue of adjacent energy storage modules being connected via an additional coupling element between output connections of their respective energy storage cell modules. By virtue of suitable actuation of the additional coupling element, the possibility is provided of implementing charge balancing between energy storage cell modules of two adjacent energy storage modules both during operation of the energy storage device and in an idle state.

A considerable advantage of this arrangement consists in that active balancing is possible during operation, i.e. discrepancies occurring between the states of charge of the modules can be balanced at any time, and not for the first time in a charging operation of the energy storage device, for example.

Advantageously, currents occurring in the energy supply branches can be balanced by energy storage modules being connected in parallel, with the result that impedance and voltage differences in parallel paths can be compensated for. This at the same time means advantageous uniform loading of the individual energy storage modules.

The additional complexity involved in terms of circuitry is advantageously low. Furthermore, there is the advantage that losses during balancing during operation can be kept low since no additional current buildup is necessary for the charge balancing.

In accordance with one embodiment, the energy storage device can have semiconductor switches, for example MOSFET switches, as coupling elements. In accordance with a further embodiment, provision can be made for the coupling elements to be configured with a full-bridge circuit. In an alternative embodiment, the coupling elements can be configured with a half-bridge circuit.

In accordance with a further embodiment, a multiplicity of first elements limiting a current or a change in current can be coupled in each case in series with one of the multiplicity of second coupling elements. This can be, for example, a resistance or an inductance which limits possible fluctuations in current intensity and ensures more uniform operation. In accordance with a further embodiment, in this case in each case one second element limiting a current or a change in current can be coupled between in each case two adjacent energy storage modules of the at least one energy supply branch.

In accordance with one embodiment of the system according to the invention, the control device can be designed to actuate the multiplicity of second coupling elements in a pulse-width-modulated clocked operating mode. As a result, by virtue of a suitable selection of frequency and pulse width, the proportion of total current which flows through the second coupling element can be set flexibly.

In accordance with one embodiment of the system according to the invention, the system can furthermore have an n-phase electric machine, where n is ≥1, which has n phase connections which are each coupled to one of the n phase lines. The system is therefore particularly well suited to use in electrically operated vehicles such as electric cars or hybrid vehicles.

In accordance with one embodiment of the method according to the invention, the actuation of one of the first coupling elements can be performed with the aid of a bang-bang controller and depending on a ratio of the states of charge of the energy storage cell modules of the first energy storage module and of the second energy storage module. This method enables a flexible method for charge balancing in a battery direct inverter which can be used even during operation of the battery direct inverter.

BRIEF DESCRIPTION OF THE DRAWINGS

Further features and advantages of embodiments of the invention result from the description below with reference to the attached drawings.

DETAILED DESCRIPTION

Figure 1:
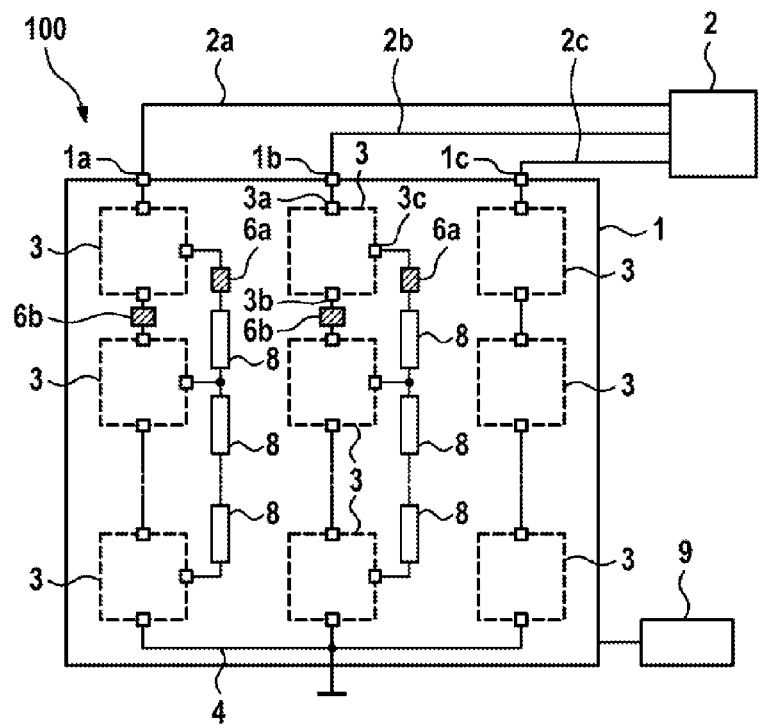
FIG. 1 shows a schematic illustration of a system comprising an energy storage device in accordance with one embodiment of the present invention.

FIG. 1 shows a system 100 for voltage conversion of DC voltage provided by energy storage modules 3 into an n-phase AC voltage. The system 100 comprises an energy storage device 1 comprising energy storage modules 3, which are connected in series in energy supply branches. By way of example, FIG. 1 shows three energy supply branches which are suitable for generating a three-phase AC voltage, for example for a three-phase machine 2. However, it is clear that any other number of energy supply branches can likewise be possible. The energy storage device 1 has an output connection 1a, 1b, 1c at each energy supply branch, which output connections are each connected to phase lines 2a, 2b and 2c, respectively. By way of example, the system 100 in FIG. 1 is used to feed a three-phase electric machine 2. However, provision can also be made for the energy storage device 1 to be used for generating electric current for an energy supply grid 2. In the case of a single-phase system, provision can be made for only one energy supply branch to be formed. This energy supply branch can then be connected as a two-port network to the supply inputs of an electrical load.

The system 100 can furthermore comprise a control device 9, which is connected to the energy storage device 1 and with the aid of which the energy storage device 1 can be controlled so as to provide the desired output voltages at the respective output connections 1a, 1b, 1c.

The energy supply branches can be connected at their end to a reference potential 4 (reference bus), which conducts an average potential in relation to the phase lines 2a, 2b, 2c of the electric machine 2 in the embodiment illustrated. The reference potential 4 can be a ground potential, for example. Each of the energy supply branches has at least two series-connected energy storage modules 3. By way of example, the number of energy storage modules 3 per energy supply branch in FIG. 1 is three, but any other number of energy storage modules 3 is likewise possible. Preferably, in this case each of the energy supply branches comprises the same number of energy storage modules 3, but it is also possible for a different number of energy storage modules 3 to be provided for each energy supply branch.

The energy storage modules 3 each have two output connections 3a and 3b, via which an output voltage of the energy storage modules 3 can be provided. Since the energy storage modules 3 are connected primarily in series, the output voltages of the energy storage modules 3 are added to form a total output voltage which can be provided at the respective one of the output connections 1a, 1b, 1c of the energy storage device 1.

Exemplary designs of the energy storage modules 3 are shown in greater detail in FIGS. 2 to 5. The energy storage modules 3 in this case each comprise a coupling device 7 comprising a plurality of coupling elements 7a, 7c and possibly 7b and 7d. The energy storage modules 3 furthermore each comprise an energy storage cell module 5 comprising one or more energy storage cells 5a to 5k connected in series.

The energy storage cell module 5 can in this case have, for example, batteries 5a to 5k, for example lithium-ion batteries, connected in series. In this case, the number of energy storage cells 5a to 5k in the energy storage modules 3 shown in FIGS. 2 to 5 is two, for example, but any other number of energy storage cells 5a to 5k is likewise possible. In other embodiments, the energy storage cells 5a to 5k can also comprise photovoltaic modules, for example.

The energy storage cell modules 5 are connected to input connections of the associated coupling device 7 via connecting lines. The coupling device 7 is in the form of a full-bridge circuit having in each case two coupling elements 7a, 7c and two coupling elements 7b, 7d, by way of example, in FIGS. 2 and 4. The coupling elements 7a, 7b, 7c, 7d can in this case each have an active switching element, for example a semiconductor switch, and a freewheeling diode connected in parallel therewith. In this case, provision can be made for the coupling elements 7a, 7b, 7c, 7d to be in the form of MOSFET switches, which already have an intrinsic diode. Alternatively, it is possible to design in each case only two coupling elements 7a, 7c such that, as illustrated by way of example in FIGS. 3 and 5, a half-bridge circuit is realized.

Figure 2:
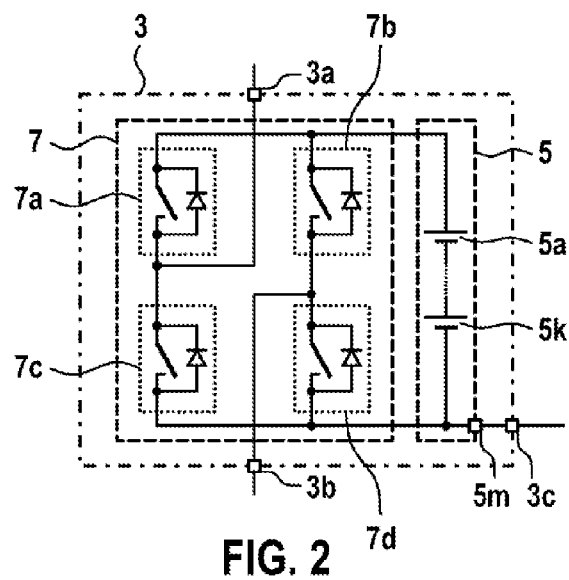
FIG. 2 shows a schematic illustration of an energy storage module of an energy storage device in accordance with a further embodiment of the invention.

The coupling elements 7a, 7b, 7c, 7d can be actuated, for example with the aid of the control device 9 illustrated in FIG. 1, in such a way that the respective energy storage cell module 5 is switched selectively between the output connections 3a and 3b or the energy storage cell module 5 is bypassed. With reference to FIG. 2, the energy storage cell module 5 can be switched between the output connections 3a and 3b in the forward direction, for example, by virtue of the active switching element of the coupling element 7d and the active switching element of the coupling element 7a being set to a closed state, while the remaining two active switching elements of the coupling elements 7b and 7c are set to an open state. A bypass state can be set, for example, by virtue of the two active switching elements of the coupling elements 7a and 7b being set to the closed state, while the two active switching elements of the coupling elements 7c and 7d are held in the open state. Similar considerations can be applied in each case for the bridge circuits in FIGS. 3 to 5.

By suitable actuation of the coupling devices 7, individual energy storage cell modules 5 of the energy storage modules 3 can be integrated in a targeted manner in the series circuit of an energy supply branch.

The energy storage device 1 of the system 100 furthermore has second coupling elements 8, which are each coupled between two adjacent energy storage modules 3 of an energy supply branch. In this case, the second coupling elements 8 couple the energy storage modules 3 in each case between output connections 3c of the energy storage modules 3. It is possible in this case for all of the energy storage modules 3 of an energy supply branch to be coupled to one another via second coupling elements 8. Alternatively, it is also possible for only some of the energy storage modules 3 of an energy supply branch to be coupled to one another. FIG. 1 shows, by way of example, two of the three energy supply branches comprising second coupling elements 8. In this case, however, it may also be possible in other embodiments for more or fewer energy supply branches comprising second coupling elements 8 to be configured.

The second coupling elements 8 are configured so as to connect the energy storage cell modules 5 of two adjacent energy storage modules 3 in parallel into the respective energy supply branch. For this purpose, the second coupling elements 8 can each comprise active switching elements, such as, for example, semiconductor switches and a freewheeling diode connected in parallel therewith. In one embodiment, the second coupling elements 8 can each have MOSFET switches, which have an intrinsic diode.

Elements 6a limiting current or a change in current can be connected in series with the second coupling elements 8. By way of example and for reasons of clarity, FIG. 1 merely shows two elements 6a which limit current or a change in current, wherein every other of the second coupling elements 8 can likewise be connected in series with such elements 6a. Furthermore, in each case further elements 6b which limit current or a change in current can be arranged between the individual energy storage modules 3. The elements 6a, 6b can have resistances or inductances, for example. It may also be possible for connecting lines to have an internal or parasitic resistance or inductance, owing to the physical wiring of the respective individual energy storage modules 3 or the second coupling elements 8 to the individual energy storage modules 3, which is sufficient in order to sufficiently limit the change in current through the energy supply branches and the paths with the second coupling elements 8. In this case, it is not necessary to provide elements 6a, 6b which limit current or a change in current separately.

The elements 6a, 6b can serve the purpose of limiting fluctuations in current intensity, so-called current ripple, on the respective lines, which fluctuations may occur owing to radiofrequency actuation of the coupling elements 7a, 7b, 7c, 7d.

As shown in FIGS. 2 to 5, the output connection 3c of the energy storage modules 3 can be connected in each case to an output connection of the energy storage cell module 5 of the energy storage module 3. For example, the output connection 3c can be coupled in each case to the negative terminal of the battery cells 5a to 5k of the energy storage cell module 5 via an output connection 5m, as is illustrated by way of example in FIGS. 2 and 3. Alternatively, it may be possible to couple the output connection 3c in each case to the positive terminal of the battery cells 5a to 5k of the energy storage cell module 5 via an output connection 5p, as is illustrated by way of example in FIGS. 4 and 5.

Figure 3:
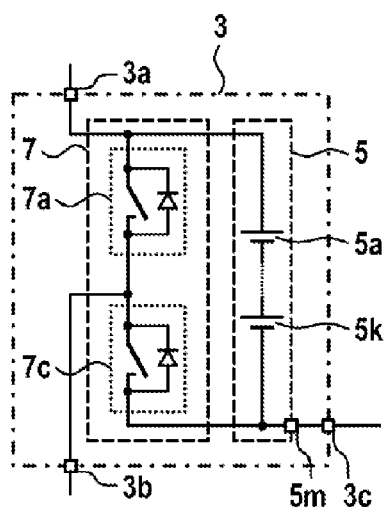
FIG. 3 shows a schematic illustration of an energy storage module of an energy storage device in accordance with a further embodiment of the invention.
Figure 4:
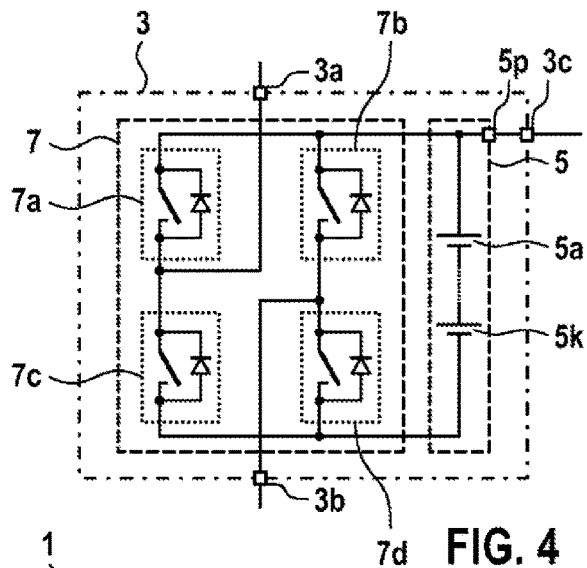
FIG. 4 shows a schematic illustration of an energy storage module of an energy storage device in accordance with a further embodiment of the invention.
Figure 5:
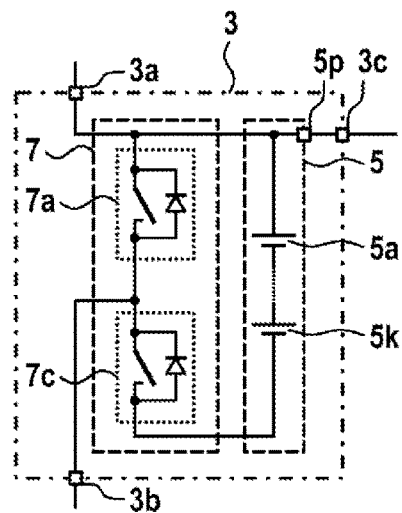
FIG. 5 shows a schematic illustration of an energy storage module of an energy storage device in accordance with a further embodiment of the invention.
Figure 6:
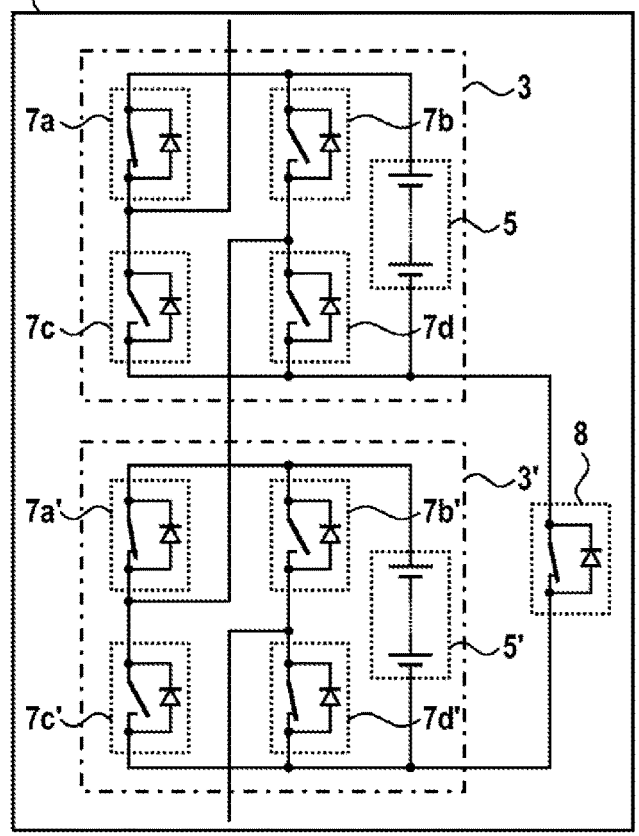
FIG. 6 shows a schematic illustration of an actuation state of two energy storage modules of an energy storage device in accordance with a further embodiment of the invention.

FIG. 6 shows a schematic illustration of an exemplary actuation state of two energy storage modules 3, 3' of an energy storage device, for example the energy storage modules 3 of an energy storage device 1 in FIG. 1. The energy storage modules 3, 3' can in this case be constructed corresponding to the configuration shown in FIG. 2, wherein corresponding configurations in accordance with one of the embodiments shown in FIGS. 3 to 5 are equally and similarly possible.

Figure 7:
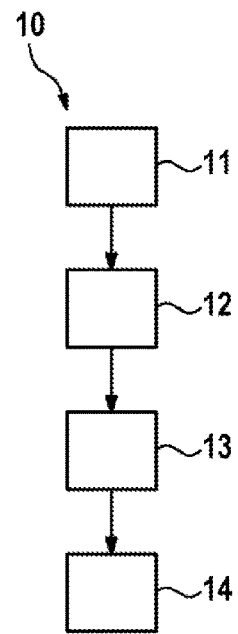
FIG. 7 shows a schematic illustration of a method for actuating an energy storage device in accordance with a further embodiment of the present invention.

The actuation state shown as a snapshot in time in FIG. 6 is used in conjunction with the method 10 illustrated schematically in FIG. 7 for explaining a method for actuating an energy storage device, in particular the energy storage device 1 in FIG. 1. In a first step 11 of the method 10, actuation of the first coupling elements 7a, 7b, 7c, 7d of a first energy storage module 3 of the at least one energy supply branch so as to switch the energy storage cell module 5 of the first energy storage module 3 into the energy supply branch takes place. As shown by way of example in FIG. 6, the coupling element 7a can be closed. If, in a step 12 of the method, the first coupling elements 7a', 7b', 7c', 7d' of the second energy storage module 3' of the at least one energy supply branch are actuated so as to switch the energy storage cell module 5' of the second energy storage module 3', which is adjacent to the first energy storage module 3, into the energy supply branch and, in a step 13, a second coupling element 8, which is coupled between the first energy storage module 3 and the second energy storage module 3', is closed, the energy storage cell module 5 of the first energy storage module 3 is switched into the energy supply branch via the path with the second coupling element 8 and the closed coupling element 7d'.

In a step 14 of the method 10, actuation of one of the first coupling elements, namely the first coupling element 7b as illustrated by way of example in FIG. 6, of the first energy storage module 3 can then take place in a pulse-width-modulated clocked operating mode depending on the states of charge of the energy storage cell modules 5, 5' of the first energy storage module 3 and the second energy storage module 3', and in periodic intervals the second energy storage cell module 5' can be connected in parallel with the first energy storage cell module 5 into the energy supply branch via the coupling element 7b and the coupling element 7d'. The coupling element 7b can be actuated for this purpose by the control device 9 in FIG. 1 in a pulse-width-modulated clocked operating mode, for example, such that the proportion of the total current which is carried by the energy storage module 3' can be set flexibly. For example, the pulse width and/or the clock frequency can be set in such a way that the proportion is between 0% and 50% of the total current.

The clocked operating mode can be realized using a bang-bang controller, for example. Preferably, the pulse-width-modulated clocked operating mode can be set in such a way that the ratio of the currents through the energy storage cell modules 5 and 5' has a predetermined value, which may be dependent on the states of charge of the energy storage cells in the energy storage cell modules 5 and 5', for example.

In the same way, in each case one of the coupling elements can be actuated in a pulse-width-modulated clocked operating mode for other switching states of the coupling elements 7a, 7b, 7c, 7d or 7a', 7b', 7c', 7d' of the energy storage modules 3 and 3' in order to implement charge balancing between the energy storage cell modules 5 and 5'.

The method 10 is particularly suitable for being implemented during operation of the energy storage device 1, i.e. when the energy storage device 1 is being operated in order to generate an n-phase output voltage. Alternatively, it may be possible to implement charge balancing between the energy storage cell modules 5 and 5' via corresponding actuation of one of the coupling elements 7a, 7b, 7c, 7d or 7a', 7b', 7c', 7d' and simultaneous closing of the second coupling element 8 without a current flowing in the energy supply branch. This can take place, for example, in an idle state of the energy storage device 1.

The invention claimed is:

1. An energy storage device (1) for generating an n-phase supply voltage, wherein $n \geq 1$, comprising:
   n energy supply branches which are connected in parallel and which are each coupled to at least one output connection (1a, 1b, 1c) of the energy storage device (1), wherein each of the energy supply branches has a multiplicity of energy storage modules (3) which are connected in series and which each comprise:
   an energy storage cell module (5), which has at least one energy storage cell (5a, 5k), and
   a coupling device (7) comprising first coupling elements (7a, 7b, 7c, 7d), which are designed to switch the energy storage cell module (5) selectively into the respective energy supply branch or to bypass said energy storage cell module; and
   wherein at least one of the energy supply branches has at least one second coupling element (8), which is coupled in each case between output connections (5m, 5p) of adjacent energy storage cell modules (5) in the at least one energy supply branch, and which is designed to switch the coupled energy storage cell modules (5) in parallel with one another into the respective energy supply branch.

2. The energy storage device (1) as claimed in claim 1, wherein the coupling devices (9) comprise coupling elements (7, 8) with a full-bridge circuit.

3. The energy storage device (1) as claimed in claim 1, wherein the coupling devices (9) comprise coupling elements (7, 8) with a half-bridge circuit.

4. The energy storage device (1) as claimed in claim 1, wherein at least a first element (6a) which limits current or a change in current is coupled in series with the at least one second coupling element (8).

5. The energy storage device (1) as claimed in claim 4, wherein in each case a second element (6b) which limits current or a change in current is coupled between in each case two adjacent energy storage modules (3) of the at least one energy supply branch.

6. The energy storage device (1) as claimed in claim 5, wherein the first element (6a) which limits current or a change in current and the second element (6b) which limits current or a change in current are inductances or ohmic resistances.

7. A system (100), comprising:
   n phase lines (2a, 2b, 2c), which can be coupled to in each case one of n phase connections of an n-phase electric machine (2);
   an energy storage device (1) as claimed in claim 1, whose output connections (1a, 1b, 1c) are coupled to in each case one of the n phase lines (2a, 2b, 2c); and
   a control device (9), which is coupled to the energy storage device (1) and which is designed to actuate the at least one second coupling element (8) depending on a state of charge of the energy storage cells (5a, 5k) of the energy storage cell modules (5) of the at least one energy supply branch for charge balancing between adjacent energy storage modules (3).

8. The system as claimed in claim 7, wherein the control device (9) is designed to actuate the second coupling element (8) in a pulse-width-modulated clocked operating mode.

9. The system as claimed in claim 7, further comprising:
   an n-phase electric machine (2), wherein $n \geq 1$, which has n phase connections, which are each coupled to one of the n phase lines (2a, 2b, 2c).

10. A method (10) for actuating an energy storage device (1) as claimed in claim 1, comprising the following steps:
- actuating (11) the first coupling elements (7a, 7b, 7c, 7d) of a first energy storage module (3) of the at least one energy supply branch so as to switch the energy storage cell module (5) of the first energy storage module (3) into an energy supply branch;
- actuating (12) the first coupling elements (7a', 7b', 7c', 7d') of a second energy storage module (3') of the at least one energy supply branch so as to switch the energy storage cell module (5') of a second energy storage module (3'), which is adjacent to the first energy storage module (3), into the energy supply branch;
- closing (13) a second coupling element (8), which is coupled between the first energy storage module (3) and the second energy storage module (3'); and
- actuating (14) one of the first coupling elements (7b) of the first energy storage module (3) in a pulse-width-modulated clocked operating mode depending on the states of charge of the energy storage cell modules (5, 5') of the first energy storage module (3) and the second energy storage module (3').

11. The method (10) as claimed in claim 10, wherein the actuation of one of the first coupling elements (7b) is performed with the aid of a bang-bang controller and depending on a ratio of the states of charge of the energy storage cell modules (5, 5') of the first energy storage module (3) and of the second energy storage module (3').

12. The energy storage device (1) as claimed in claim 1, wherein at least a first element (6a) which limits current is coupled in series with the at least one second coupling element (8).

13. The energy storage device (1) as claimed in claim 12, wherein in each case a second element (6b) which limits current is coupled between in each case two adjacent energy storage modules (3) of the at least one energy supply branch.

14. The energy storage device (1) as claimed in claim 12, wherein in each case a second element (6b) which limits a change in current is coupled between in each case two adjacent energy storage modules (3) of the at least one energy supply branch.

15. The energy storage device (1) as claimed in claim 1, wherein at least a first element (6a) which limits a change in current is coupled in series with the at least one second coupling element (8).

16. The energy storage device (1) as claimed in claim 15, wherein in each case a second element (6b) which limits current is coupled between in each case two adjacent energy storage modules (3) of the at least one energy supply branch.

17. The energy storage device (1) as claimed in claim 15, wherein in each case a second element (6b) which limits a change in current is coupled between in each case two adjacent energy storage modules (3) of the at least one energy supply branch.

* * * * *